C. H. TAYLOR.
HANDLE FOR LAWN MOWERS.
APPLICATION FILED NOV. 7, 1913.
1,096,073.
Patented May 12, 1914.
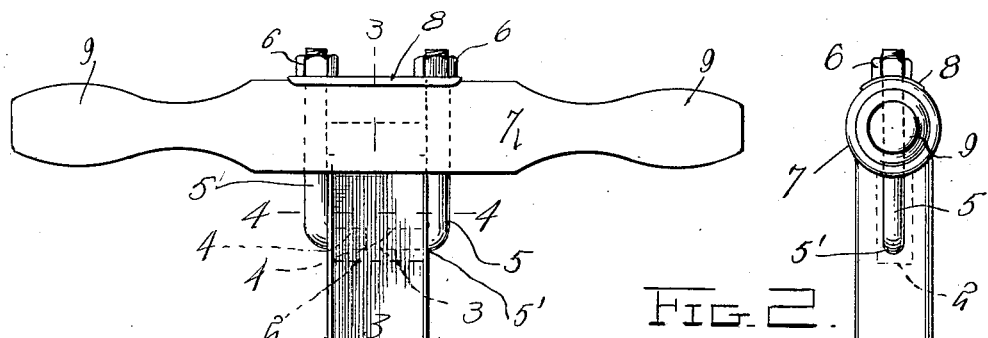
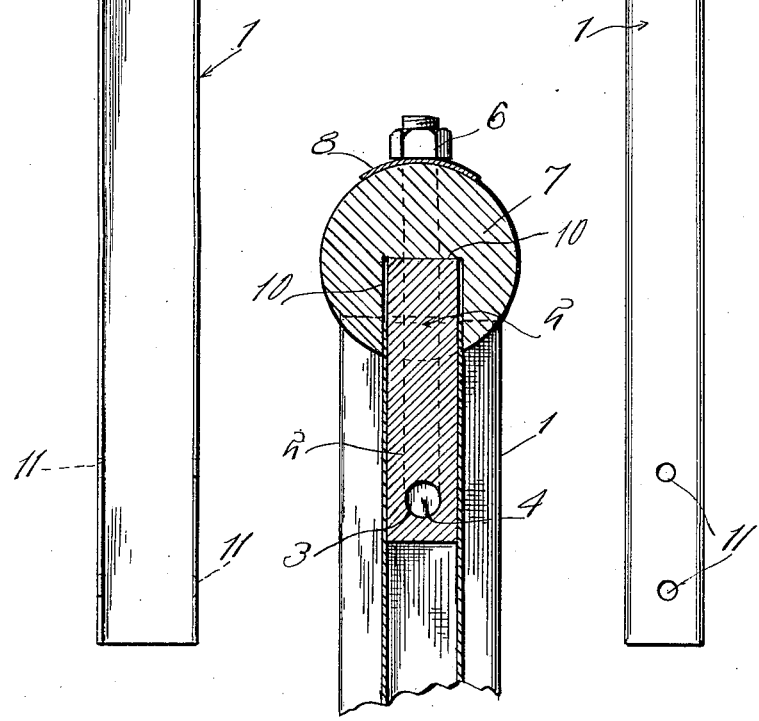
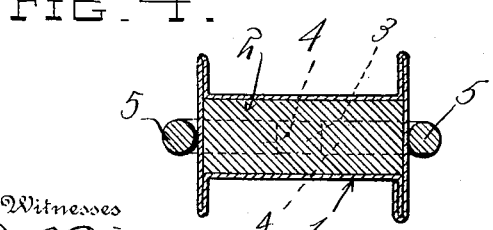
Inventor
C. H. Taylor.

UNITED STATES PATENT OFFICE.

CHARLES H. TAYLOR, OF NEWBURGH, NEW YORK.

HANDLE FOR LAWN-MOWERS.

1,096,073. Specification of Letters Patent. Patented May 12, 1914.

Application filed November 7, 1913. Serial No. 799,728.

*To all whom it may concern:*

Be it known that I, CHARLES H. TAYLOR, a citizen of the United States, residing at Newburgh, in the county of Orange, State of New York, have invented certain new and useful Improvements in Handles for Lawn-Mowers; and I do hereby declare the following to be a full, clear, and exact description of the invention, such as will enable others skilled in the art to which it appertains to make and use the same.

The present invention is directed to handles for lawn mowers, and has for its object to provide a device of this character which has its shank formed from metal and the cross bar therefor formed from wood.

A further object of the invention is to construct a lawn mower handle which is extremely simple in construction, and one which will last indefinitely.

With these and other objects in view, this invention resides in the novel features of construction, formation, combination and arrangement of parts to be hereinafter more fully described, claimed and illustrated in the accompanying drawing, in which:—

Figure 1 is a front elevation of the device. Fig. 2 is a side view. Fig. 3 is a sectional view on line 3—3 of Fig. 1. Fig. 4 is a similar view on line 4—4 of Fig. 1.

Referring to the drawing, the numeral 1 designates a shank, which is formed from sheet metal, and is substantially I-shape in cross section, and hollow throughout its length so that the shank will be light. Mounted in the upper end of the shank 1 is a metal block 2, the lower end of which is provided with a transverse bore 3 in which is engaged the lateral extensions 4 of the arms 5, said extensions being passed through perforations 5' formed in the shank. The arms 5 extend upwardly along the upper end of the shank 1 and are screw threaded for engagement by the clamping nuts 6. The arms 5 are passed through the handle bar 7, and through the wear plate 8, which prevents injury to the cross piece 7, which is formed from wood, when the nuts 6 are tightened. The opposite ends of the cross piece 7 terminate in rounded hand grips 9. The cross piece 7 is formed with a mortise 10, which is engaged by the upper end of the block 2, and partially by the upper end of the shank 1, so that upon manipulation of the nut 6, the yoke will be drawn upwardly, thus tightly forcing the block 2 into the mortise 10, thereby firmly connecting the cross piece 7 to the shank 1. The lower end of the shank 1 is provided with openings 11, so that the frame of the lawn mower may be conveniently attached thereto.

What is claimed is:

1. A handle of the class described comprising a sheet metal shank hollow throughout its length, a block mounted in its upper end, a bore formed transversely in the block, arms having lateral extensions passing through the shank and engaged in the bore, said arms passing upwardly and bearing against the sides of the shank, a hand bar having a mortise formed therein for engagement by the upper end of the shank and block, said arms passing through the handle bar, and having clamping nuts engaged upon their upper ends, as and for the purpose set forth.

2. A handle of the class described comprising a hollow shank, a block mounted in the upper end of the shank, arms having their lower ends connected to the block, a handle bar engaged with the upper end of the shank, said arms passing through the handle bar, as and for the purpose set forth.

In testimony whereof, I affix my signature, in the presence of two witnesses.

CHARLES H. TAYLOR.

Witnesses:
 ELIZABETH A. FLYNN,
 THOMAS J. HARRELL.

Copies of this patent may be obtained for five cents each, by addressing the "Commissioner of Patents, Washington, D. C."